(12) United States Patent
Meacham (10) Patent No.: US 11,203,062 B2
(45) Date of Patent: Dec. 21, 2021

(54) ADDITIVE METAL MANUFACTURING PROCESS

(71) Applicant: G. B. Kirby Meacham, Cleveland, OH (US)

(72) Inventor: G. B. Kirby Meacham, Cleveland, OH (US)

(*) Notice: Subject to any disclaimer, the term of this patent is extended or adjusted under 35 U.S.C. 154(b) by 554 days.

(21) Appl. No.: 16/033,105

(22) Filed: Jul. 11, 2018

(65) Prior Publication Data
US 2020/0016653 A1 Jan. 16, 2020

(51) Int. Cl.
| | |
|---|---|
| B22F 1/00 | (2006.01) |
| B22F 5/00 | (2006.01) |
| B22F 10/00 | (2021.01) |
| B22F 10/70 | (2021.01) |
| B22F 10/10 | (2021.01) |
| B33Y 10/00 | (2015.01) |
| B22F 3/24 | (2006.01) |
| B22F 7/02 | (2006.01) |
| B22F 10/20 | (2021.01) |
| B33Y 80/00 | (2015.01) |

(Continued)

(52) U.S. Cl.
CPC .............. *B22F 1/0059* (2013.01); *B22F 3/24* (2013.01); *B22F 5/006* (2013.01); *B22F 7/02* (2013.01); *B22F 10/00* (2021.01); *B22F 10/10* (2021.01); *B22F 10/20* (2021.01); *B22F 10/70* (2021.01); *B22F 2003/247* (2013.01); *B22F 2003/248* (2013.01); *B22F 2303/40* (2013.01); *B29C 64/147* (2017.08); *B33Y 10/00* (2014.12); *B33Y 30/00* (2014.12); *B33Y 70/00* (2014.12); *B33Y 80/00* (2014.12)

(58) Field of Classification Search
CPC ........ B22F 1/0059; B22F 5/006; B22F 10/70; B33Y 10/00; B29K 2105/256; B29C 51/02; B29C 64/147
See application file for complete search history.

(56) References Cited

U.S. PATENT DOCUMENTS

| | | | | |
|---|---|---|---|---|
| 3,510,296 A | * | 5/1970 | Bergstrom ............ | B22F 1/0003 419/11 |
| 4,617,054 A | * | 10/1986 | Mathers .................. | B22F 5/006 75/246 |

(Continued)

FOREIGN PATENT DOCUMENTS

GB 2059443 A * 4/1981 ................ B22F 7/02

*Primary Examiner* — Anthony J Zimmer
*Assistant Examiner* — Sean P. O'Keefe (57) ABSTRACT

Three dimensional "green" parts are formed by combining sheet layers comprising metal powder bound together by a polymer. The "green" parts are then sintered to drive off the polymer and consolidate the metal powder to produce a monolithic metal part. Particularly, the invention is directed to processes for forming and stacking the shaped sheet layers that are readily automated and preserve the high value powder metal and polymer sheet trim scrap for reuse resulting in an additive overall process with little material waste. The invention includes processes in which "green" elements formed by methods such as three dimensional printing are incorporated into the "green" stack and become an integral part of the final sintered part. It further includes processes in which "green" sheet layers are shaped by methods such as hot bending or vacuum forming to provide three dimensional part features.

7 Claims, 9 Drawing Sheets

(51) Int. Cl.
  *B33Y 30/00* (2015.01)
  *B33Y 70/00* (2020.01)
  *B29C 64/147* (2017.01)

(56) References Cited

U.S. PATENT DOCUMENTS

| | | | | |
|---|---|---|---|---|
| 5,015,312 A | * | 5/1991 | Kinzie | B26D 7/1863 |
| | | | | 156/63 |
| 2015/0321417 A1 | * | 11/2015 | Mironets | B23P 15/00 |
| | | | | 156/263 |
| 2016/0347001 A1 | * | 12/2016 | Katakura | B29C 64/165 |
| 2017/0170695 A1 | * | 6/2017 | Yamamoto | H01F 41/0273 |
| 2017/0297097 A1 | * | 10/2017 | Gibson | B33Y 70/00 |
| 2018/0214946 A1 | * | 8/2018 | Spears | B29C 64/147 |

* cited by examiner

ADDITIVE METAL MANUFACTURING PROCESS

This application claims the priority pf U.S. Provisional Application 62/516,246 filed Jun. 7, 2017.

FIELD OF THE INVENTION

The present invention is directed to processes for additive formation of a "green" three dimensional metal part from sheets comprising metal powder bound together by a polymer. In one variation of the process each sheet layer has a two-dimensional shape such that a laminated "green" stack has the form of the metal part. The polymer is removed from the stack and the metal powder is sintered to substantially full density to form a homogeneous metal part using known techniques. More particularly, the invention is directed to processes for forming and stacking the shaped sheet layers that are readily automated and preserve the high value powder metal and polymer sheet trim scrap for reuse resulting in an additive process with little material waste. The invention includes processes in which "green" elements formed by methods such as three dimensional printing are incorporated into the "green" stack and become an integral part of the final sintered part. It further includes processes in which "green" sheet layers are shaped by means such as hot bending or vacuum forming to provide three dimensional part features.

BACKGROUND OF THE INVENTION

Additive manufacturing, in particular three dimensional printing, has emerged as a quick and economical means of producing complex components directly from digital files without requiring molds or other custom tooling. It is very convenient for prototypes and short production runs in certain cases, and can produce components too complex to form by conventional means, particularly components with complex internal geometry. Three dimensional printing uses a number of different processes, but in general builds three dimensional geometric solids by using an XY scanning device to form successive two dimensional material layers on top of each other, where the two dimensional geometry of each layer may be different from the layer below to build a three dimensional solid with varying cross-sections at different Z dimensions. The technology has matured to the point that desktop printers that produce plastic components are economical enough for home hobbyists.

Process limitations of commonly available three dimensional printing include speed and materials choices. Deposition layer thickness is generally constant and relatively thin to allow good resolution of the finest detail in the part. Layer thickness typically cannot be increased to allow faster build in solid sections where there is little or no cross-section change from layer to layer, limiting build speed. Common three dimensional printing materials are polymers, and in many cases the finished component material properties are inferior to molded or machined polymer components. Three dimensional printing of metals is not commonly available, and is limited to producing high value parts for applications such as medical implants and aerospace components that are not readily produced by other means. This typically involves processes such as laser fusing of metal powder to add fully dense metal to the part, and is a technically demanding operation requiring expensive equipment and skilled staff.

There is an ongoing industry effort to develop material systems and processes for additive manufacturing of fully functional metal parts that are cost-competitive with more traditional approaches such as casting, forging and machining, while providing the benefits of three dimensional printing, particularly tool-free prototype and short run production directly from digital files and the ability to produce complex components. This effort is exemplified by Desktop Metal, which has announced an affordable metal part making system in which metal powder in a molten polymer binder is deposited by a moving print head to form "green" parts in a three dimensional printer similar to those widely used for plastic parts. The "green" parts are then thermally processed in a microwave furnace to drive off the polymer binder and fuse the metal powder into a fully dense metal parts. The "green" part formation process is, however, relatively slow since it is limited by the rate at which the print head can lay down bulk material in simple structural areas of the parts while still providing the required fine detail in other areas. This slowness therefore affects the degree to which the process can scale up from experimental parts to production parts while competing with more conventional approaches.

Metal injection molding is a related process in which powder metal in a molten polymer binder is injected into a tool cavity to form a "green" part which is then sintered. Metal injection molding is not a direct competitor to three dimensional printing since it is a fast, high volume process with significant tooling costs and does not have the same capability of forming complex features inside the parts. It does, however, include applicable technology for compounding metal powders in polymer binders and sintering the "green" parts to full density.

There is an unmet need for an affordable additive metal part making process with many of the advantages of three dimensional printing but having a "green" part build rate more comparable to metal injection molding.

SUMMARY OF THE INVENTION

The present invention is directed to processes for forming "green" parts in the form of stacked laminated sheets of metal powder in a polymer binder that are subsequently sintered to form full density metal parts. In broad outline:

1. Metal powder and polymer binder are compounded, heated and extruded, cooled, and cut to size to form precursor sheets of powder metal in a polymer binder. Multiple sheet thicknesses may be made.
2. The precursor sheets are temporarily bonded to carrier trays by a means such as contact adhesive to stabilize the position of the sheet pieces during and after subsequent printing and sheet cutting operations.
3. Ink jet printing is optionally used to apply a ceramic powder in a polymer binder to selected areas within the boundaries of the sheet cutouts that will be added to laminated stack. The purpose of the ceramic powder is to prevent bonding of the sheet cutout to the overlying cutout in the laminated stack in the selected area during sintering, and is typically used to facilitate removal of sacrificial support structures after sintering.
4. Ink jet printing is used to apply contact adhesive to the top sides of the precursor sheets in selected areas within the boundaries of the sheet cutouts that will be added to the laminated stack. Adhesive is not applied to the top side of trim scrap areas. The purpose of the adhesive is to allow a flat platen to selectively stick to and lift the sheet cutouts from the trim scrap in a later step. Relatively benign contact adhesives such as acrylic formulations are chosen to minimize the effect of adhesive recycled with the trim scrap and burned off during the sintering process.

5. The precursor sheets in carrier trays which are positioned in an X-Y cutting machine to form the sheet cutouts. Preferably a cold, clean method such as pure waterjet cutting, knife cutting or router cutting is used to prevent thermal damage to the metal powder or polymer binder or the introduction of contaminants such as abrasive grit that could interfere with trim scrap recycle to new sheet extrusion.

6. The carrier trays and the sheet cutouts are moved to the stack building station. Pick and place platens about the size of the stack are pressed against the sheet cutouts corresponding to a given stack lamination layer. The platens selectively bond to the sheet cutouts because of the contact adhesive applied in Step 4. The platens then lift the sheet cutouts and transfer them to the top of the stack. Contact area and contact adhesive tackiness on the tops and bottoms of the sheet cutouts are adjusted to assure that they are lifted by the platen rather than remaining on the tray.

7. The platens press the sheet cutouts against the top of the stack such that the contact adhesive bonds them to the cutouts below. The platens then lift leaving the sheet cutouts on the top of the stack. Platen and top sheet cutout separation is optionally assisted by a puff of compressed gas flowing out through an array of holes in the platen.

8. The pick and place process continues until the laminated "green" part stack is complete and ready to sinter. Multiple trays of sheet cutouts of different thickness may contribute to the stack, where thick sheets are used to build simple geometry and thin sheets are used for finer detail. Further, polymer-bound powder metal "green" subassemblies with compatible sintering properties made by any process including three dimensional printing may be added during the stack building process to provide features such as very fine detail or a different material composition. Similarly, hot formed sheet material components may be added.

9. After sintering and cooling any temporary support structures are removed and the dense metal part is ready for secondary operations such as finish machining. Support structure removal is facilitated by the non-fused parting surfaces provided by the ceramic powder in a polymer binder applied in optional Step 3.

10. Trim scrap is removed from the trays after the sheet cutouts are used up and prepared for recycling to the material stream entering the compounding and sheet extrusion operation to recover and reuse the high value metal powder and the polymer binder within the operation.

The net result is a fast additive metal part manufacturing process with high material utilization that covers the range of one-off prototype fabrication to relatively high production runs. The process requires more steps than basic three dimensional printing, but the added steps are established automated industrial processes such as thermoplastic sheet formation, ink jet printing, water jet cutting, pick and place handling, three dimensional printing of detailed components, and thermal shaping of plastic sheet. The underlying chemistry and physics of compounding, forming and sintering powder metal with a polymer binder are well established, as are contact adhesives which are widely used in consumer and industrial products and are available with a range of performance properties and application methods.

DESCRIPTION OF DRAWINGS

The appended claims set forth those novel features that characterize the invention. However, the invention itself, as well as further objects and advantages thereof, will best be understood by reference to the following detailed description of an exemplary embodiment. The accompanying drawings, where like reference characters identify like elements throughout the various figures in which:

DETAILED DESCRIPTION OF THE INVENTION

Upon examination of the following detailed description the novel features of the present invention will become apparent to those of ordinary skill in the art or can be learned by practice of the present invention. It should be understood that the detailed description of the invention and the specific examples presented, while indicating certain embodiments of the present invention, are provided for illustration purposes only. Various changes and modifications within the spirit and scope of the invention will become apparent upon examination of the following detailed description of the invention and claims that follow.

The invention is described with reference to the exemplary metal part shown in the figures, but it is to be understood that the invention is applicable to a variety of metal part configurations and sizes.

The invention comprises a novel combination of several technologies and physical phenomena:

1. "Green" metal parts formed from metal particles in a thermoplastic polymer binder, in particular spherical particles with a relatively broad size distribution, have an inherent tendency to consolidate to fully dense metal during an appropriate sintering temperature cycle. While not wishing to be bound by theory, it is thought that as the binder is driven off by rising temperature, the metal particles make contact and bind to each other. Increasing temperature then causes surface tension in the metal to draw the particles closer until the surface area is minimized and the metal is fully dense. This takes place at temperatures less than the bulk melting point of the metal so that the part shrinks but maintains the geometry of the "green" metal part. It is further believed that this is a robust effect that will draw the metal particles together and eliminate the thin gaps formed by thermoplastic adhesive layers in the "green" laminated sheet structures of this invention, resulting in fully consolidated metal parts. The same effects allow compatible "green" powder metal and polymer binder structures made by other processes such as three dimensional printing to be added to the laminated structures and consolidated into the final sintered part.

2. Cold, clean cutting processes, including but not limited to pure water jet cutting, will leave uncontaminated trim scrap without thermal damage that may be added to the new powder metal and thermoplastic polymer binder material entering the compounding and sheet extrusion processes. While not essential to part production, this approach minimizes material waste and overall part cost. Water jet printing is particularly well suited to prototype or short run production since it is software-controlled and does not require hard physical tooling. Hard tooling such as press cutting dies that yield equivalent results may be economically preferable for long run production. More generally, any sheet cutting process, preferably but not necessarily one that maintains orientation and positioning of the lamination layer sheet cutouts, is applicable.

3. Thermoplastic contact adhesives with a wide range of tackiness are available that may be applied to selected areas of the "green" laminated sheet structures of this invention to facilitate component positioning and selective pickup during automated stack building operations. While not wishing to be bound by theory, it is believed that modest amounts of thermoplastic contact adhesive will be driven off with the polymer metal powder binder during the initial stages of the sintering operation. It is also believed that it will either not materially affect the quality of extruded sheet utilizing recycled trim scrap or may be removed before recycling. Application by software-controlled ink jet printing is advantageous for prototypes and short production runs, while other known methods such as screen printing may be economically preferable for long run production.

4. Strong metallic consolidation between lamination layers in the sintering process may be prevented by deposition of a thin layer of ceramic powder in a polymer binder applied to selected areas of the "green" laminated sheet structures. While not wishing to be bound by theory, it is believed that the ceramic powder layer will not bind to itself or the metal particles of the adjacent lamination layers and reduces the tendency of the metal particles on the adjacent layers to bond across the gap. Use of such masking layers allows easier post-sintering removal of temporary supports that reduce distortion of the part during sintering. Optimally, temporary support removal is by breaking along the weakened layer rather than machining. Masking layer application options are similar to those for contact adhesive application.

Figure 1:
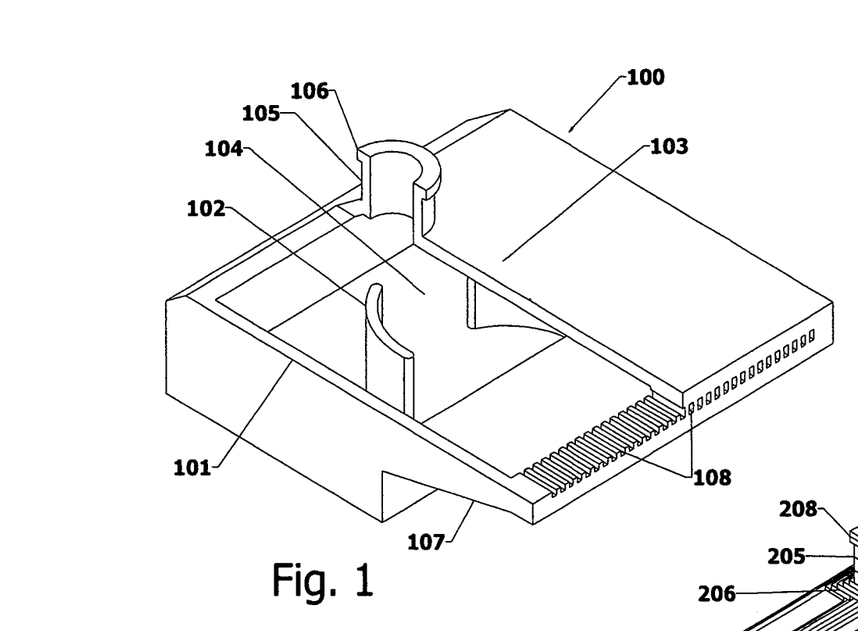
FIG. 1 shows an exemplary metal component manufactured by conventional means.

FIG. 1 shows the exemplary metal part 100 manufactured by conventional means. It has a generally hollow shell 101 with vertical vanes 102 connecting the top and bottom walls 103 and 104. The top wall 103 is penetrated by a nipple 105 having a flange 106. An overhanging tapered section 107 leads to an array of small nozzle-like passages 108 between the inside volume and the outside. Part 100 is clearly a candidate for three dimensional metal printing and sintering, but a printing process with sufficient resolution to produce the array of passages 108 would be slow and inefficient in producing the relatively simple geometry of the other part features including temporary supports (not shown) to support tapered section 107 during sintering.

Figure 2A:
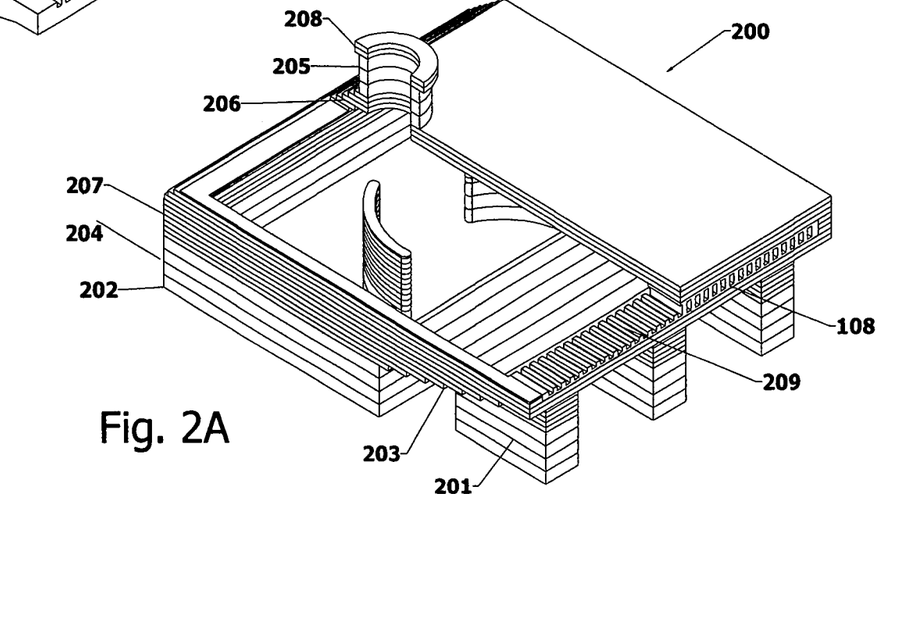
FIG. 2A shows an equivalent component manufactured according to the invention and FIG. 2B shows a detail of the equivalent component.
Figure 2B:
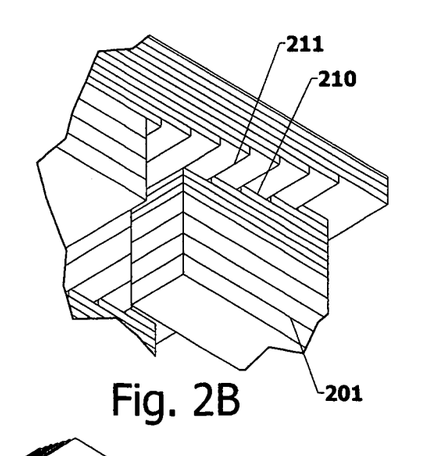

FIG. 2A and 2B show an equivalent part 200 made according to the teachings of this invention. Temporary posts 201 support the overhung tapered section 202. The simplest features such as the bottom 202 and vertical walls 204 and 205 are made from relatively thick laminated cutouts of sheet material comprising metal powder in a thermoplastic binder. More complex shapes including sloped surfaces 203 and 206 are made from relatively thin laminated cutouts 207 and 208 made from sheet material of similar composition. It should be noted that most lamination layers include noncontiguous areas that must be kept in alignment between the cutting and the stacking steps. A separate metal powder-thermoplastic binder component 209 that incorporates the array of nozzle-like passages 108 is added to the laminate stack. Component 209 is made by an alternative process such as three dimensional printing to achieve a level of detail not practical with sheet laminating. As will be described in more detail below, ceramic powder masking layers 210 separate the temporary posts 201 from the overlying layers comprising the lower surface 211 of the tapered section to facilitate the removal of the posts 203 after sintering. Also, contact adhesive between the lamination layers keeps the "green" stack together and in alignment prior to sintering.

Figure 3:
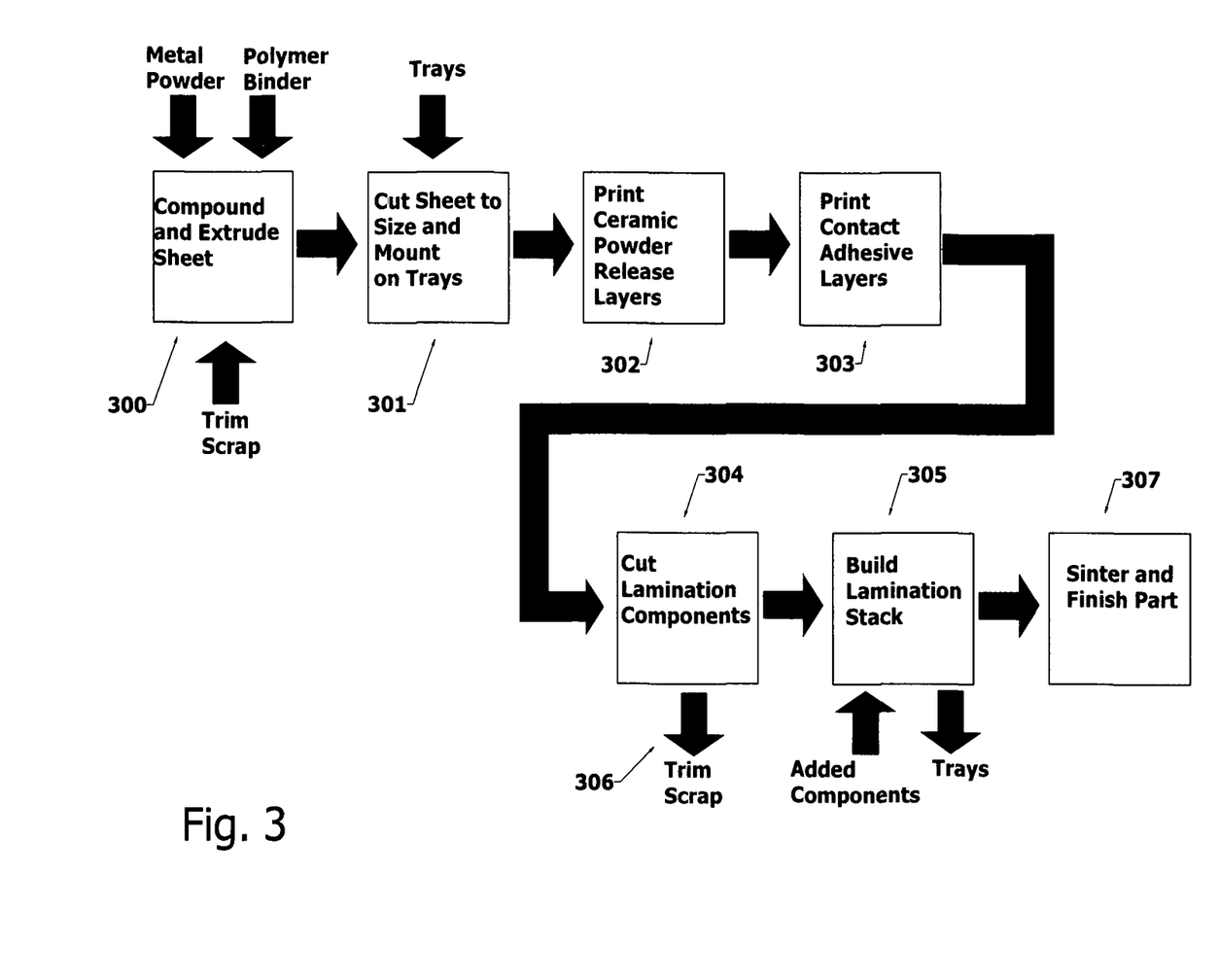
FIG. 3 shows an overall process for producing the exemplary metal component according to the invention.
Figure 4A:
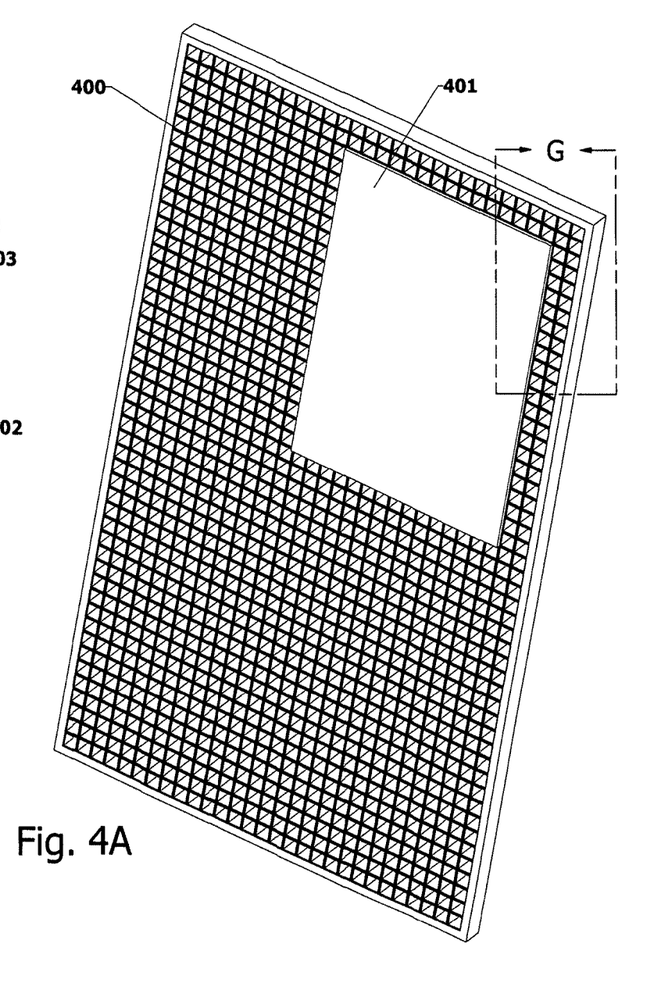
FIG. 4A and FIG. 4B show a "green" sheet of metal powder in a polymer binder attached to a carrier tray and ready for further processing.
Figure 4B:
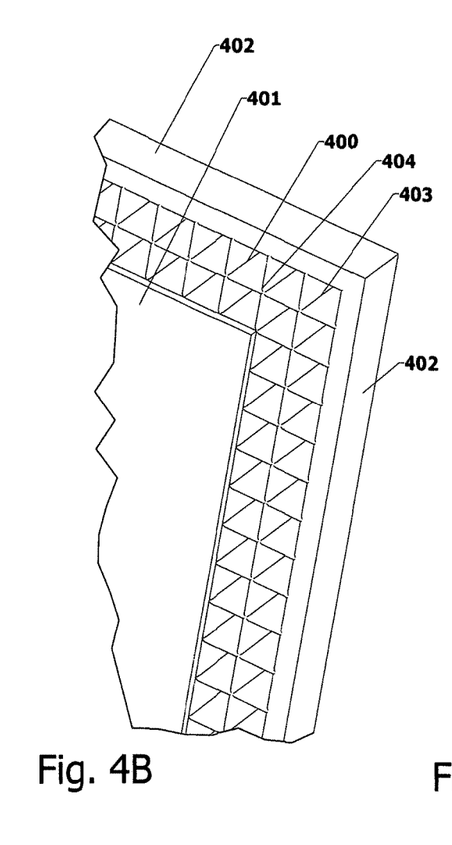

FIG. 3 diagrams the process for forming "green" laminated metal parts according to this invention. The individual process steps are described in more detail with reference to FIG. 4 to FIG. 10. The first step 300 is compounding metal powder and thermoplastic polymer binder together with trim scrap which is then extruded to form various thicknesses of sheets of metal powder in a polymer binder. This is known technology, and will not be described in further detail. It may be a separate operation since the sheet is readily stored, transported, and used as needed. Sheets of metal powder in a polymer binder are cut to size and mounted to carrier trays in a series of operations grouped as step 301. A carrier tray 400 and a cut sheet 401 are shown in FIG. 4. The carrier tray 400 in this embodiment has precision edges 402 to facilitate precise positioning and a grid of perforations 403 to provide exit paths for subsequent water jet cutting of the sheet 401. The sheet 401 is temporarily attached to the carrier tray 400 by contact adhesive (not shown). The adhesive may be applied as a thin layer to the carrier tray 400, the sheet 401, or both. Selective coating of only the grid edges 404 has the advantage of minimal adhesive usage and little or no adhesive carryover to trim scrap that is subsequently recycled to form new sheets. The adhesive generally holds the sheet 401 in a fixed position relative to the tray 400 during subsequent printing, cutting and laminating steps. It is particularly important in holding lamination components in fixed positions after they are cut free from the sheet 401 by resisting any lateral forces from the water jet cutting or subsequent handling. At the same time the limited area adhesive bond is weak enough to allow lamination components to be lifted from the tray by a platen contacting a substantially larger contact adhesive layer on top of the component. The known availability of contact adhesives with a range of tackiness allows further adjustment of the hold-down force between the component and the tray versus the lift force between the component and the platen. The cutting and adhesive mounting of the sheets 401 to the trays 400 may be accomplished in a number of known ways ranging from manual operations to highly automated operations, and will not be described in more detail. FIG. 3 also calls out step 302, printing ceramic powder release layers; step 303, printing contact adhesive layers; step 304, cutting lamination components from the sheets; step 305, building the lamination stacks, and step 306, recycling the trim scrap. These steps are described in more detail in reference to FIG. 5 through FIG. 10. Step 307, sintering the final "green", is known art and is not described in detail. In this example the temporary bonding of the sheets 401 to the trays 400 forms an assembly that may be precisely positioned in the subsequent printing, cutting and stack building operations to assure accurate register between the operations and result in a well-aligned stack and clean trim scrap. Maintaining registration of material between operations is a common industrial practice, and other m ethods will be obvious to those of ordinary skill in the art.

Figure 5:
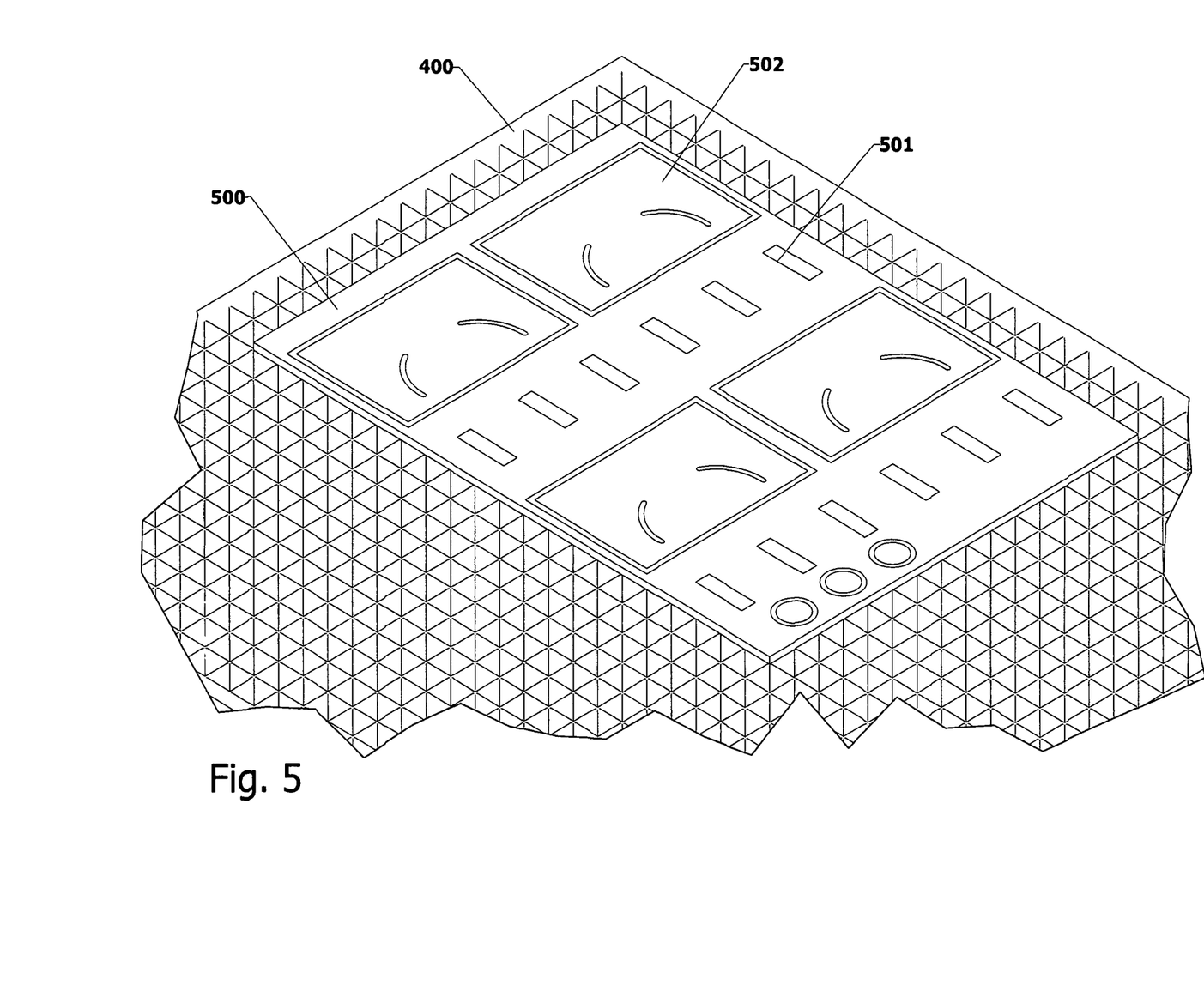
FIG. 5 shows a thicker "green" sheet of metal powder in a polymer binder attached to a carrier tray after a printing operation that adds contact adhesive in selected areas.

FIG. 5 shows a thicker "green" sheet of metal powder in a polymer binder 500 attached to a carrier tray 400 after a printing operation that adds contact adhesive in selected areas 501 on the top side 502 of the sheet 500. The selected areas are all within the perimeters of the lamination components that will be added to the stack, and none are on the top side 502 in the areas that will become trim scrap. This has the dual purpose of allowing the lamination components to stick selectively to the lifting platen and reducing the adhesive content of the recycled trim scrap. The adhesive printing may be carried out by known means including software controlled ink jet printing at prototype or low volume production volumes and screen printing at higher volumes.

Figures 6A, 6B:
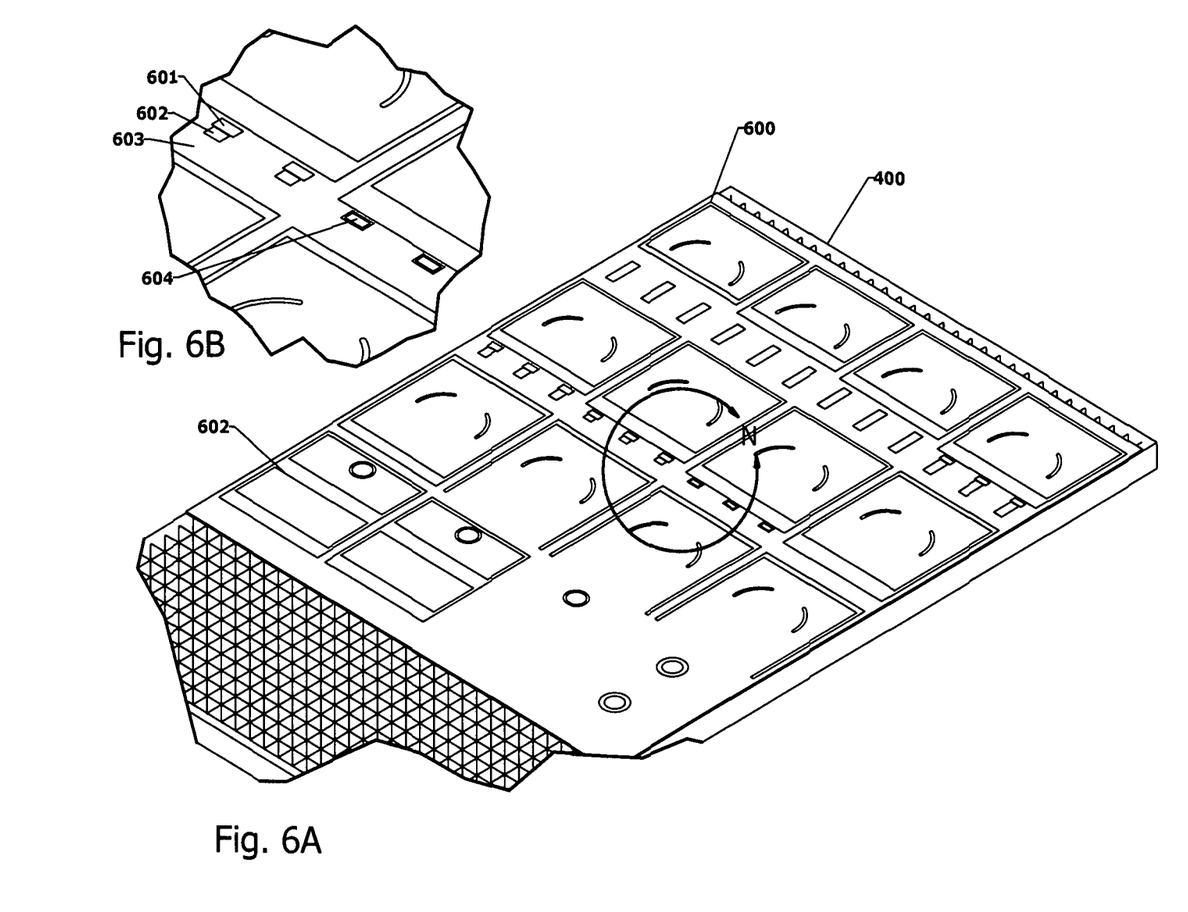
FIGS. 6A and 6B show a thinner "green" sheet of metal powder in a polymer binder attached to a carrier tray after printing operations that add ceramic powder release layers and contact adhesive in selected areas.

FIG. 6 shows a thinner "green" sheet of metal powder in a polymer binder 600 attached to a carrier tray 400 after printing operations that first add ceramic powder release layers in a first set of selected areas 601 and subsequently add contact adhesive in a second set of selected areas 603 on the top side 603 of the sheet 600. Certain of the contact adhesive areas 602 are on top of the ceramic powder release layers in the selected areas 601, and 604 indicates an example of such a superposition. The selected areas 601 and 602 are all within the perimeters of the lamination components that will be added to the stack, and none are on the top side 603 in the areas that will become trim scrap. This has the dual purpose of allowing the lamination components to stick selectively to the lifting platen and reducing the adhesive and ceramic powder content of the recycled trim scrap. The ceramic powder release layer and the adhesive printing may be carried out by known means including software controlled ink jet printing at prototype or low volume production volumes and screen printing at higher volumes. These two operations do not need to be carried out by the same printing means, and a curing or drying step may be needed between the ceramic and adhesive printing operations because of the layer superposition 604.

Figures 7A, 7B:
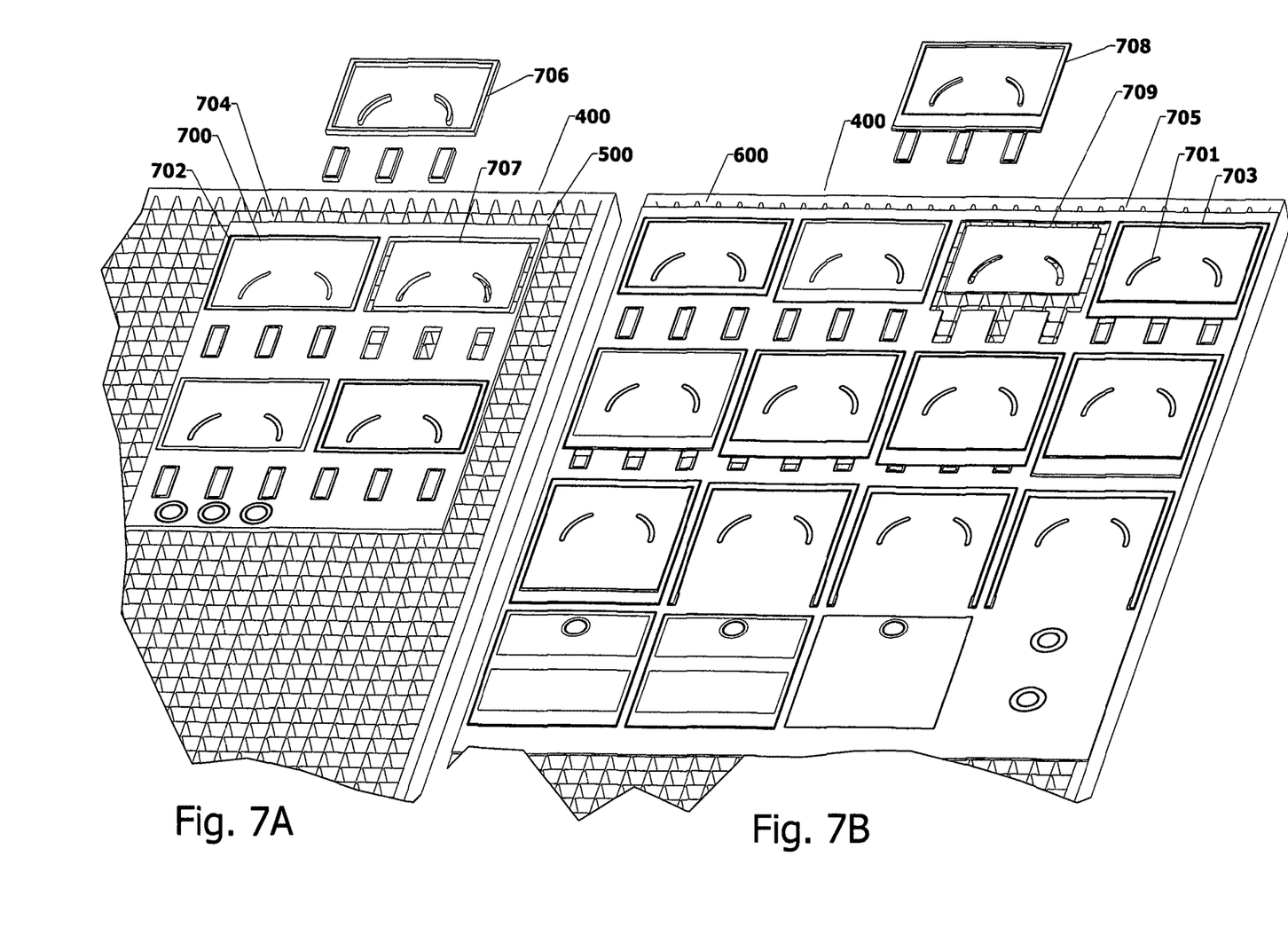
FIG. 7A and FIG. 7B respectively show the thicker and thinner "green" sheets following cutting operations that form the lamination layer sheet cutouts that will be stacked to form the exemplary metal component according to the invention while leaving the lamination layer sheet cutouts nested in pockets in the sheet trim scrap.

FIG. 7 shows the thicker 500 and thinner 600 "green" sheets attached to carrier trays 400 following a cutting operation that forms the lamination layer sheet cutouts 700 and 701 that will be stacked to form the exemplary metal component according to the invention, while leaving the lamination layer sheet cutouts 700 and 701 nested in pockets 702 and 703 in the sheets 500 and 600. The areas 704 and 705 comprise trim scrap to be recycled to the compounding and sheet extrusion operation. Exemplary lamination layer cutout 706 is shown lifted out of its pocket 707 in sheet 500 and lamination layer cutout 708 is shown lifted out of its pocket 709 in sheet 600 to emphasize that the cutouts may consist of noncontiguous elements. Software controlled pure water jet cutting (apparatus not shown) is a well-known process for making such cuts that does not introduce extraneous material such as abrasive grit that could contaminate the metal part or the recycled trim scrap or thermally damage the material. It will be obvious to those skilled in the art that a number of alternative processes including but not limited to knife cutting, routing, jigsaw cutting, under either software or manual control, can yield similar results for prototype or short production runs. Die cutting also provides similar results and may be the most economical option at high production volumes. Hot processes such as laser cutting are also within the scope of the invention for applications in which thermal damage to the trim scrap is either not a consideration or determined to be minimal enough that recycled material with thermal effects does not degrade the final product. Clearly the design of the carrier tray 400 could be altered to be compatible with different cutting methods, while retaining a capability to maintain the positions of the lamination layer sheet cutouts 700 and 701 in the carrier tray 400 during and after the cutting operation that is provided by temporary contact adhesive bonds between the cutouts and the tray in this exemplary water jet option.

Figure 8A:
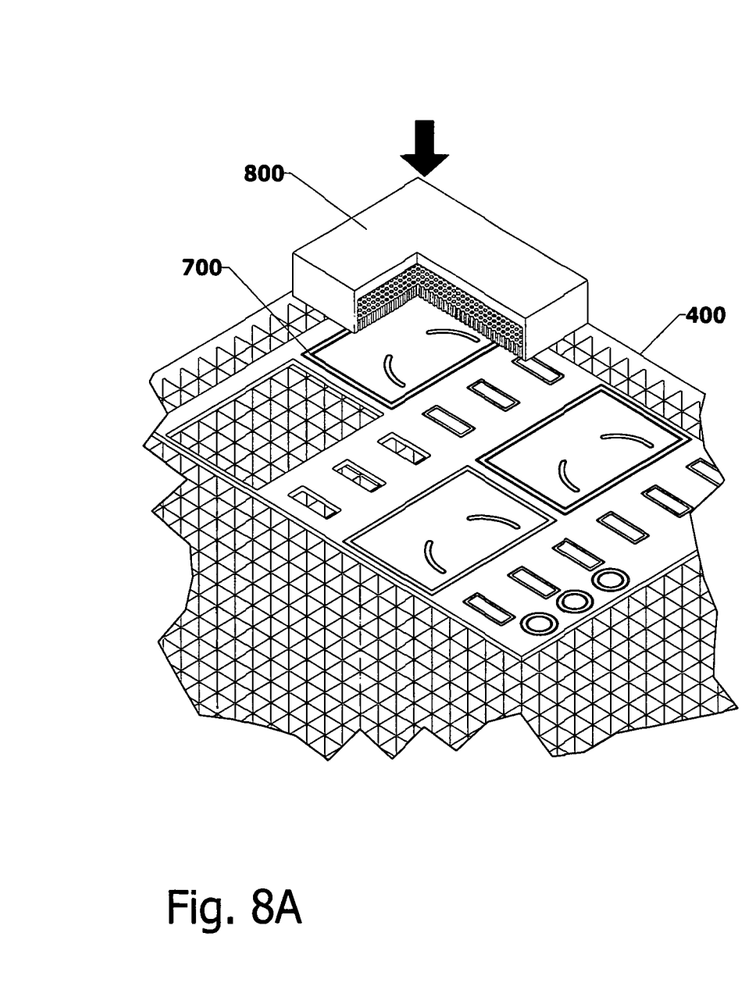
FIG. 8A and FIG. 8B show a platen positioned by a pick and place system lifting a single noncontiguous lamination layer sheet cutout from pockets in the trim scrap utilizing adhesive forces between the platen and contact adhesive on the noncontiguous pieces comprising the single lamination layer sheet cutout.
Figure 8B:
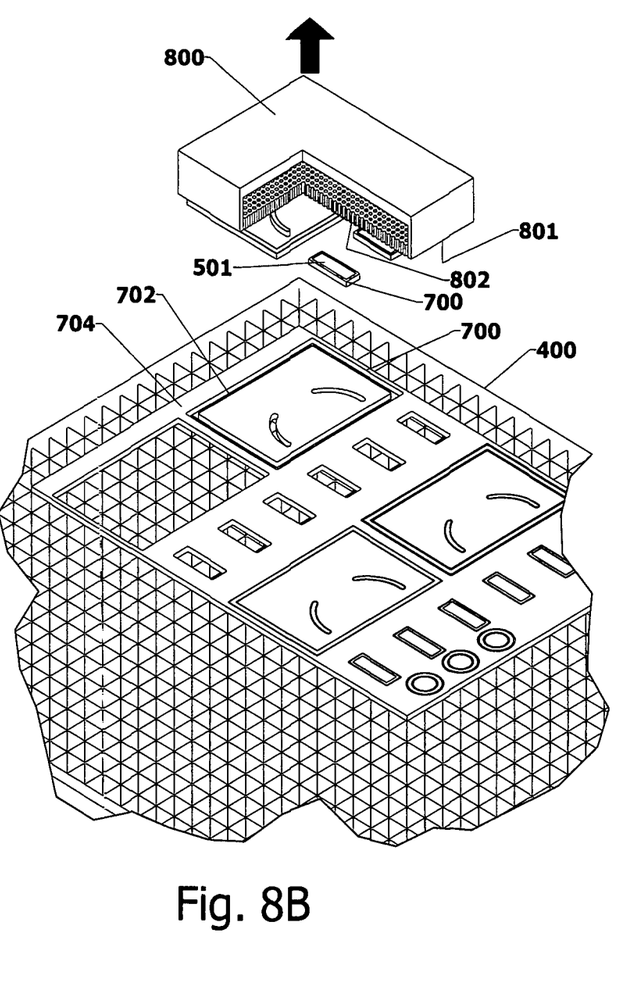

FIGS. 8A and 8B show a platen 800 positioned by a software controlled pick and place system (not shown) lifting a single noncontiguous lamination layer sheet cutout 700 from pockets 702 in the trim scrap 704 utilizing adhesive forces between the lower platen face 801 and contact adhesive areas 501 on the noncontiguous pieces comprising the single lamination layer sheet cutout 700. These adhesive forces are adjusted by the area and the tackiness of the contact adhesive areas 501 so that they are substantially higher than the adhesive forces between the bottom of the sheet cutout 700 and the tray 400 and reliably lift all the cutout components. The lack of adhesive on the surrounding trim scrap 704 allows the platen to press down hard enough to bond to the cutout without developing significant adhesion to the trim scrap. The platen size and position is chosen so that it only contacts one lamination cutout at a time. Optionally, segmented platens may be used to vary the effective platen size and shape to better match variations in laminate cutout sizes and shapes. The process maintains the positional relationship between the noncontiguous components of the lamination cutout 700 during the transfer to the laminated stack. An array of holes 802 in the platen contact face 801 should be noted. A momentary puff of gas through the array of holes 802 may be used to aid in the separation of the platen 800 from the adhesive areas 501 of cutout 700 in a later process step.

Figure 9A:
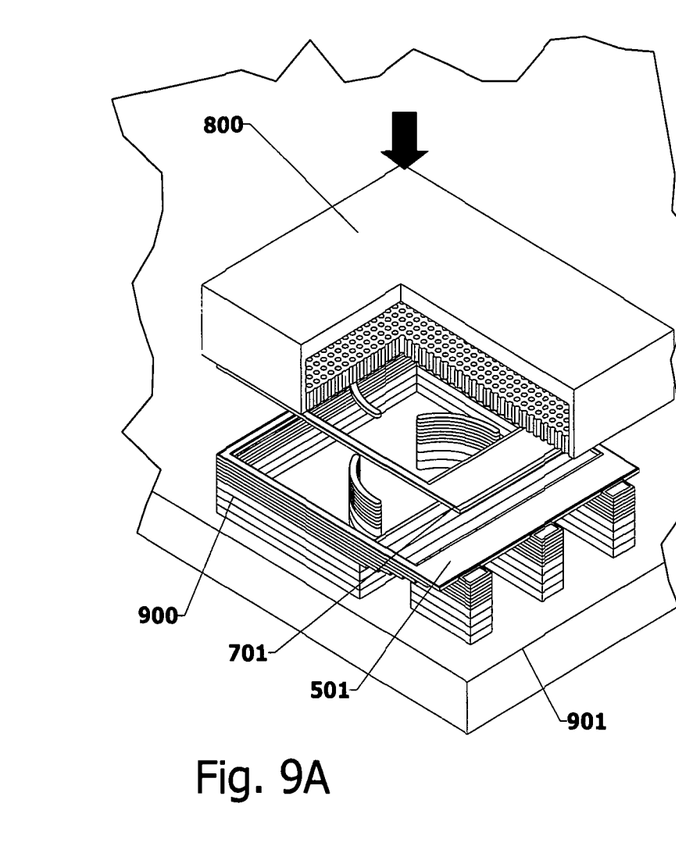
FIG. 9A and 9B illustrate the platen adding the lamination layer sheet cutout to the stack and lifting away to leave the lamination layer sheet cutout bonded to the stack.
Figure 9B:
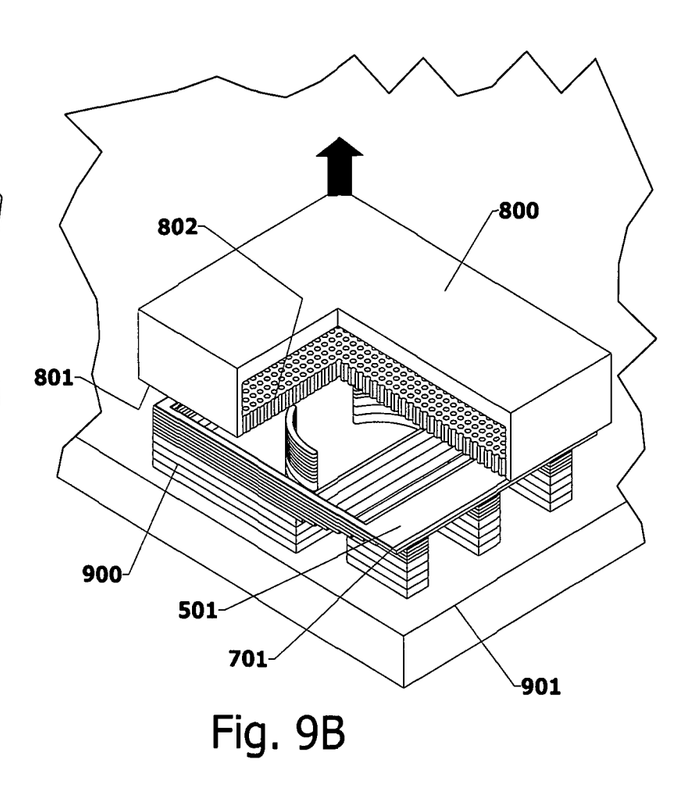

FIGS. 9A and 9B illustrate the platen 800 adding a lamination layer sheet cutout 701 to the partially completed lamination stack 900 and lifting away to leave the lamination layer sheet cutout bonded to the stack being formed on flat surface 901. The cutout 700 bonds to the stack through the adhesive areas 501 on the top of the previous lamination layer, and separation of the platen from the adhesive areas of cutout 700 is assured by a puff of compressed gas flowing out through the array of holes 802 in the platen contact face 801 at the start of the platen lift motion. Means (not shown) such as adhesive or vacuum may be used to temporarily fix the bottom lamination of the stack 900 to the flat surface 901 and prevent stack movement during the addition of subsequent lamination layers. The contact adhesive layers 501 on the lamination layers 700 collectively bond the "green" stack into a monolithic body that may be easily handled and transported to subsequent operations including sintering.

Figure 10A:
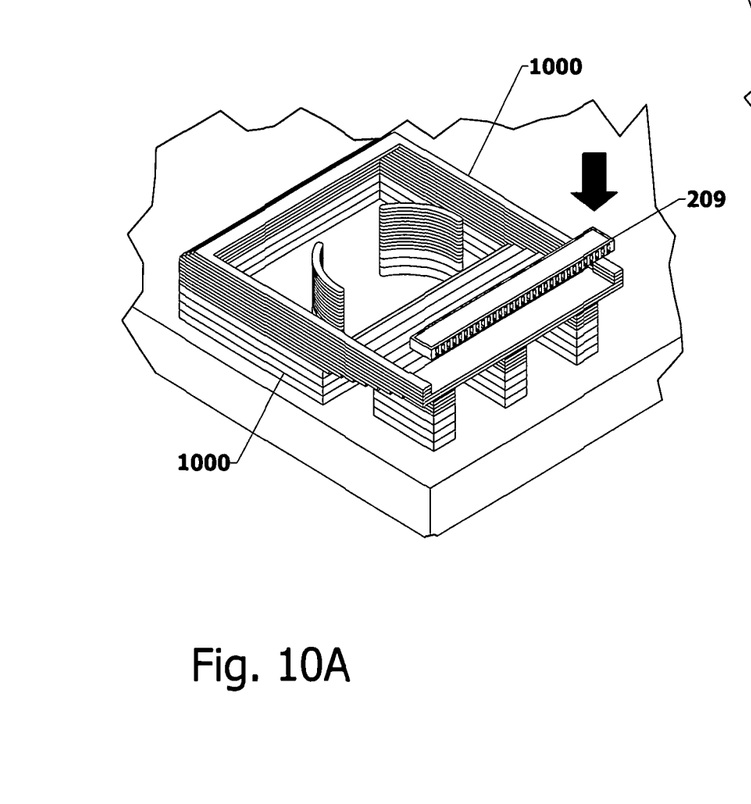
FIG. 10A illustrates the addition of a more detailed "green" three dimensional component added to the laminated stack for integration into the final component.
Figure 10B:
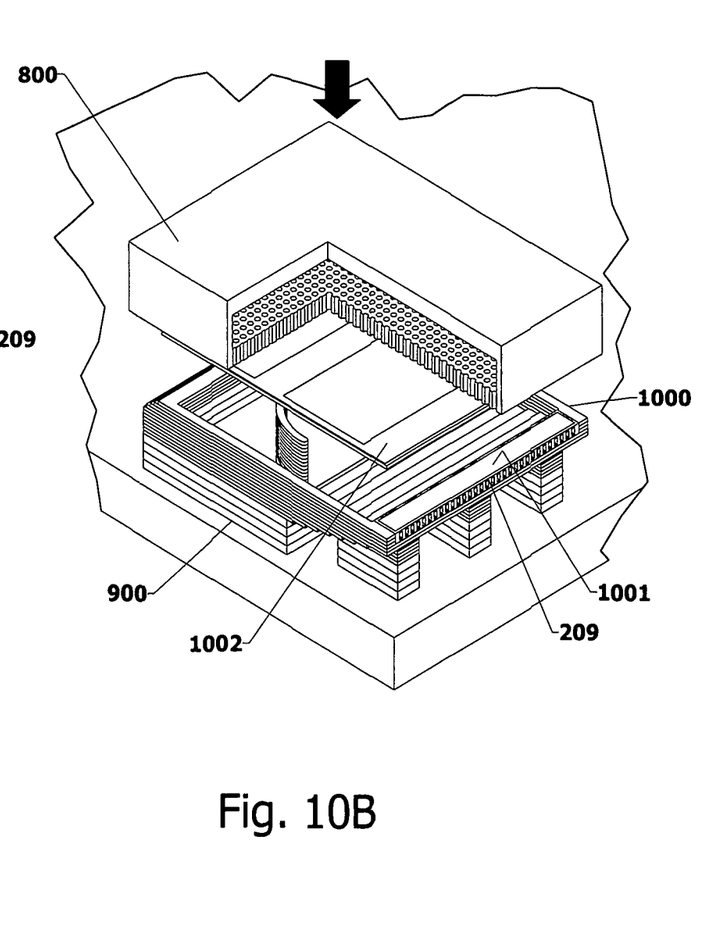
FIG. 10B shows the subsequent addition of a lamination layer.

FIG. 10A and FIG. 10B illustrate the addition of a more detailed "green" three dimensional component 209 added to the partially completed laminated stack 1000 for integration into the final "green" component 200 shown in FIG. 2A.

Component 209 may be inserted automatically or manually, and may have a contact adhesive layer 1001 on its top surface to bond to the subsequent lamination layer sheet cutout layer 1001. FIG. 10A shows the insertion in progress and FIG. 10B show the component 209 in place and the subsequent lamination layer 1002 being added by the platen 800.

The "green" component 200 may receive additional processing prior to sintering or at any point during part assembly. Such processing includes but is not limited to machining operations and moderate heating and/or pressing to further consolidate the laminated structure. It should be also noted that largely manual methods may be used to construct laminated "green" components, together with "green" components formed by other methods that are then sintered to form functional or artistic metal objects using the sheet materials, adhesives and ceramic powder release layers according to the teachings of this invention. Further, the "green" sheet materials may be shaped by low cost processes common to plastic sheet such as heating and bending or vacuum forming to increase the variety of metal objects that may be made by the basic process. Use of appropriate kiln furniture could facilitate the sintering of parts with large, thin sheet sections by providing support to minimize slumping.

What is claimed is:

1. An additive metal manufacturing process for producing a fully dense monolithic three dimensional metal part comprising the following steps:

compounding metal powder and a thermoplastic polymer to form a metal powder filled plastic composite that is heated, mechanically shaped, and then cooled to produce thermoplastic composite sheets of one or more different thicknesses;

cutting and/or heating and deforming the thermoplastic composite sheets to produce green trim scrap and one or more thermoplastic metal powder composite geometric shapes that singly or in combination have at least a portion of the three dimensional shape of the monolithic metal part, wherein contact adhesive is applied to one or more of the thermoplastic metal powder composite geometric shapes such that the contact adhesive forms temporary bonds with a pick and place mechanism platen to move the geometric shapes to placement in a three dimensional part assembly and optionally bonding together of the geometric shapes comprising the three dimensional part assembly;

optionally adding one or more additional thermoplastic metal powder composite geometric shapes produced by three dimensional printing to the three dimensional part, wherein contact adhesive is optionally used to secure the additional geometric shapes to the three dimensional part assembly; and sintering the thermoplastic metal powder composite three dimensional part assembly to form a monolithic metal part and recycling the green trim scrap to the compounding step such that the scrap is utilized in the production of additional metal powder filled plastic composite to produce additional thermoplastic composite sheets;

wherein the pick and place mechanism platen is segmented to vary the effective platen size and shape to match variations in the size and shape of the thermoplastic metal powder composite geometric shapes.

2. The additive metal part manufacturing process of claim 1 wherein two or more of the thermoplastic metal powder composite geometric shapes are laminated face to face such that in aggregate after sintering the thermoplastic metal powder composite geometric shapes form a monolithic metal feature with a thickness approximately equal to the sum of the thicknesses of the laminated thermoplastic composite geometric shapes.

3. The additive metal part manufacturing process of claim 1 wherein two or more of the thermoplastic metal powder composite geometric shapes are held in proximity by polymer adhesive layers such that the geometric shapes maintain their relationship during handling and merge during sintering to form the monolithic metal part.

4. The additive metal part manufacturing process of claim 1 wherein two or more of the thermoplastic metal powder composite geometric shapes are separated by a layer of ceramic powder in selected areas such that during sintering the geometric shapes do not merge in the selected areas to form a monolithic metal feature.

5. The additive metal part manufacturing process of claim 1 wherein contact adhesive is applied to a carrier tray and/or the composite shapes, to form temporary bonds with the thermoplastic metal powder composite geometric shapes such that these temporary bonds maintain the positions of the geometric shapes.

6. The additive metal part manufacturing process of claim 5 wherein the carrier tray has positioning features such that the positions of the thermoplastic metal powder composite geometric shapes in the carrier tray is determined when the tray is moved.

7. The additive metal part manufacturing process of claim 5 wherein multiple carrier trays, containing the thermoplastic metal powder composite geometric shapes of different thickness, are accessible to the pick and place mechanism platen.

\* \* \* \* \*